(12) United States Patent
Delaine

(10) Patent No.: US 7,547,059 B2
(45) Date of Patent: Jun. 16, 2009

(54) SYSTEM FOR PASSING CABLES BETWEEN THE BODY AND A DOOR OF A MOTOR VEHICLE, AND VEHICLE COMPRISING SAID SYSTEM

(75) Inventor: Christophe Delaine, Thoiry (FR)

(73) Assignee: Renault S.A.S., Boulogne Billancourt (FR)

( * ) Notice: Subject to any disclaimer, the term of this patent is extended or adjusted under 35 U.S.C. 154(b) by 565 days.

(21) Appl. No.: 10/541,323

(22) PCT Filed: Dec. 19, 2003

(86) PCT No.: PCT/FR03/03853

§ 371 (c)(1),
(2), (4) Date: Dec. 23, 2005

(87) PCT Pub. No.: WO2004/062969

PCT Pub. Date: Jul. 29, 2004

(65) Prior Publication Data

US 2006/0219446 A1    Oct. 5, 2006

(30) Foreign Application Priority Data

Dec. 31, 2002    (FR) .................................. 02 16937

(51) Int. Cl.
*H02G 3/00* (2006.01)
*B60J 5/00* (2006.01)

(52) U.S. Cl. ................................ 296/146.9; 174/152 G

(58) Field of Classification Search ................. 296/208, 296/146.9, 146.11, 146.12; 174/68.1–136, 174/152 G See application file for complete search history.

(56) References Cited

U.S. PATENT DOCUMENTS 1,764,946 A * 6/1930 Flynn .......................... 292/139
6,135,538 A * 10/2000 Serizawa et al. .......... 296/146.7

(Continued)

FOREIGN PATENT DOCUMENTS

DE    35 00 359    2/1986

(Continued)

Primary Examiner—Hilary Gutman
Assistant Examiner—Melissa A Black
(74) Attorney, Agent, or Firm—Oblon, Spivak, McClelland, Maier & Neustadt, P.C.

(57) ABSTRACT

A system for passing cables between a body and door of a motor vehicle. The system includes a flexible sheath containing electrical cables, ends of the sheath being connected to an edge wall of the door and a fixed wall of the body respectively. The flexible sheath includes an axially-extensible part having one end fixed to the body and another end connected to the edge wall of the door at the edge of a cable passage hole disposed in the edge wall, such that the extensible part lengthens when the door is opened. Moreover, the cables include a free length inside the door such that they can slide in the sheath to absorb variations in the length of the sheath as the door pivots. The sheath extends beyond the end of the axially-deformable part fixed to the body, by a flexibly-deformable part with an end connected to the body at the cable passage in the wall of the body. The cables include a free length inside the door such that they can slide into the sheath and absorb variations in the length of the sheath as the door pivots.

16 Claims, 2 Drawing Sheets

U.S. PATENT DOCUMENTS 6,312,046 B1 * 11/2001 Sora et al. .................. 296/208
6,328,498 B1 * 12/2001 Mersch ....................... 403/175
6,534,713 B2 * 3/2003 Kafer ........................ 174/72 A

FOREIGN PATENT DOCUMENTS

FR 2 569 146 2/1986
JP 2000-195357 7/2000

* cited by examiner

SYSTEM FOR PASSING CABLES BETWEEN THE BODY AND A DOOR OF A MOTOR VEHICLE, AND VEHICLE COMPRISING SAID SYSTEM

BACKGROUND OF THE INVENTION

I. Field of the Invention

The present invention relates to a cable-passage system between the body and a door of a motor vehicle.

It relates more particularly but not limitatively to cable passages that must be implemented between a central lateral column of a motor vehicle provided with two side doors, and the rear side door which is hinged on this column, also known as the "center pillar".

II. Description of Related Art

It is well known that passages for electrical conductors necessary for the operation of certain devices, such as motors of electric window lifters or door-locking systems, must be provided between the body of a vehicle and a door. In general, these cables are guided and protected by a sheath of flexible material connecting the respective walls of the body and of the door in sealed manner, these walls being substantially facing one another, at the level of the edge of the door. The sheath can be deformed in flexion in order to absorb the differences of spacing between the said walls during pivoting of the door, and for this purpose it has a U-shaped loop such that the sheath is located between the two said walls when the door is closed, in a seat provided for this purpose in the body, this U-shaped member spreading apart when the door is opened. The sheath is traditionally formed by a kind of corrugated rubber tube, which gives it the required deformability in flexion.

To limit the necessary clearance of the sheath and therefore to reduce its length, this cable passage is commonly situated at a level at which the variation of clearance between the walls where the ends of the sheath are fixed is minimal, and therefore traditionally at a substantially middle level over the height of the door, allowing for the usual shape of doors and the placement of pivoting hinges.

Evolutions of the structure of new vehicles, however, have led to modifications of the said center pillar, which in particular is less broad. In addition, for safety reasons affecting the use of transversal elements of the structure of doors, situated substantially at half height of the door, and aimed at preventing or limiting deformations of the side walls of the body, it has been necessary to shift the openings cut into the said edge walls of the door to permit the passage of cables toward the bottom of the door, although they used to be located at midheight, as indicated in the foregoing. One consequence is that the required clearance is greater, which would imply a need to increase the length of the sheath. But then a problem of congestion would develop, for lack of space to locate this lengthened sheath between the door and the center pillar when the door is closed, and, in addition, the longer loop formed by the sheath leads to the risk that it may be crushed during closing of the door.

Japanese Patent 2000-195357 describes a bellows for protection of a cable bundle, designed so as to be extensible. There is one embodiment in which the cable bundle can slide inside the sheath and have the same length as it.

German Patent 3500359 describes a sheath in the form of a variable-length bellows, designed in such a way as to permit sliding of the cables on the body side.

BRIEF SUMMARY OF THE INVENTION

The purpose of the present invention is to provide an improved cable-passage system and, in particular, a system that ensures reliable protection of the cables without introducing difficulty into common use of the vehicle during pivoting of the door and, moreover, without complicating the mounting of this system on the vehicle during manufacture.

With these objectives in view, the object of the invention is a cable-passage system between the body and a door of a motor vehicle, of the type provided with a flexible sheath through which the electric cables pass and the ends of which are joined respectively to an edge wall of the door and to a fixed wall of the body.

According to the invention, this system is characterized in that the said sheath is provided with an axially extensible part, one end of which is fixed to the body and the other end is connected to the edge wall of the door on the border of a cable-passage orifice cut into the said edge wall, in such a manner that the said extensible part of the sheath becomes longer when the door is opened, the cables having sufficient free length inside the door such that they can slide into the said sheath to absorb the length variations thereof during pivoting of the door.

The system according to the invention therefore makes it possible to ensure guidance and protection of the cables between the vehicle body and a door, even when the clearance between those ends of the sheath that are connected respectively to the said body and to the door is relatively large, and without nevertheless generating increased congestion between the edge of the door and the facing body wall. In fact, as will already have been understood, the axially extensible part of the sheath acts as a bellows, whose length can vary considerably, the length variations being compensated at the level of the cables by the free length allowed to them inside the door so that they can slide freely into the sheath, in its part that is closest to the door.

According to a particular arrangement of the invention, the axially extensible part is corrugated and has a conical general shape, which flares out on the door side.

This particular arrangement facilitates the axial deformations of the sheath while facilitating its return to the compressed position during closing of the door, and the flaring on the door side also facilitates the sliding of the cabling inside the sheath.

According to a preferred embodiment of the invention, the sheath is prolonged beyond the end of the axially deformable part that is fixed on the body, via a part which is deformable in flexion and the end of which is joined to the body at the level of the cable passage in the body wall.

This arrangement is aimed at permitting the use of the same sheath regardless of the placement thereof, for example on the right side or on the left side of the vehicle, even though the positions of cable-passage cutouts in the vehicle body are not necessarily at the same level on both sides of the vehicle, or would require symmetric and therefore different sheaths for the right side and for the left side, as will be better understood hereinafter. The part that is deformable in flexion but remains static once the sheath has been connected to the vehicle body makes it possible, in fact, to adapt the shape of the sheath between the cable-passage cutout in the body wall and a fixed point of this same wall, where the end of the extensible part is fixed.

Also preferably, the end of the sheath joined to the body is composed of a first connecting element of an electrical connector suitable for being coupled with a second connecting element of the connector, which is fixed permanently on the body wall.

This arrangement in fact makes it possible, during construction of the vehicle, to prepare the cabling of the door separately from that of the vehicle, and to fix the sheath containing the said cabling on the said door, then to connect this cabling electrically to the electric circuit of the vehicle in very simple manner by virtue of the connector, at the time of mounting the door on the vehicle body.

According to another preferred arrangement, the end of the axially deformable part is fixed on the body wall by a fixation member rigidly connecting a flange integral with the sheath to the body wall.

This arrangement facilitates creation of means for fixation of the said extensible part on the body, in particular the flange being able to be formed in one piece with the sheath, during molding thereof.

According to other particular arrangements:
  the fixation member is fixed on the body wall by an elastic sleeve-joint arrangement. It then has the form of a kind of "clip", which can be fixed on the body wall by simply snapping it into place, greatly facilitating the mounting of the said sheath.
  the fixation member is a bracket that clamps the sheath, two lugs of the bracket passing into respective holes of the flange before it is clipped into the body wall.
  the end of the sheath on the door side is provided with a groove that is countersunk into the border of the passage opening cut into the edge wall of the door to keep the sheath fixed in sealed manner on the said edge wall.
  the cables emerging from the sheath on the door side slide freely into the axially deformable part of the sheath and are fixed inside the door with a free length between the point of fixation in the door and the end of the sheath fixed on the door that is sufficient to permit elongation of the sheath without pulling on the cables during opening of the door.

Another object of the invention is a motor vehicle provided with at least one door equipped with electric devices, characterized in that it is provided between the said door and its body with a cable-passage system such as defined in the foregoing.

Other characteristics and advantages will become evident in the description to be given of a motor vehicle provided with a cable-passage system according to the invention.

BRIEF DESCRIPTION OF THE DRAWINGS

Reference will be made to the attached drawings, wherein.

DETAILED DESCRIPTION OF THE INVENTION

Figure 1:
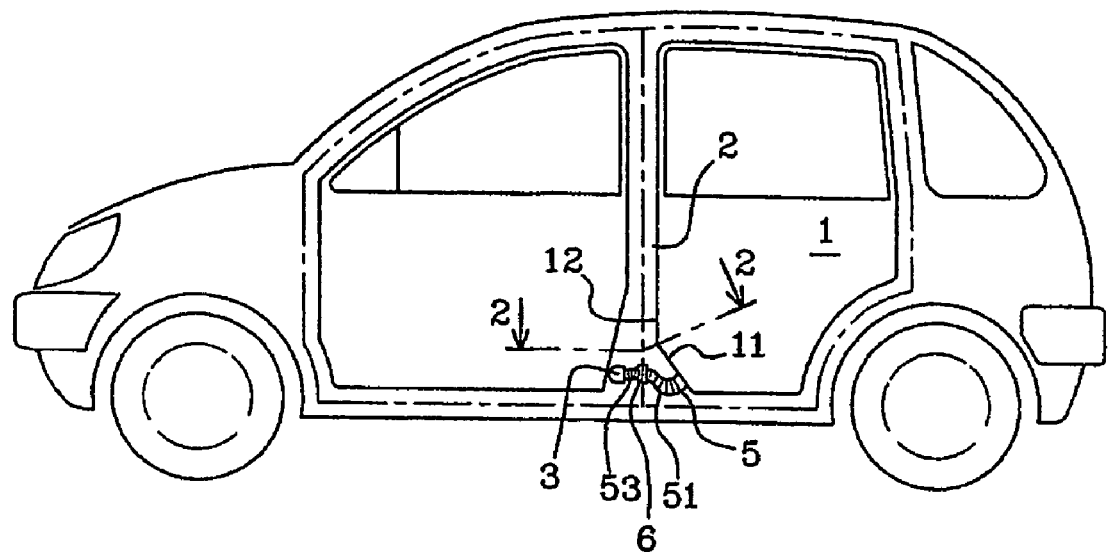
FIG. 1 is a side view of the vehicle, showing the location of the system between a center pillar and a rear door.

On the drawing of FIG. 1 there is illustrated a vehicle viewed from the left side, provided with two side doors, the contours of which are represented by dot-dash lines, while the body openings constituting the door entrances are represented by solid lines.

There will now be described a system according to the invention, used as a cable passage between rear door 1 and central column or "center pillar" 2 of the body. This system substantially comprises a molded rubber sheath 5, which connects the bottom of the center pillar to an inclined lower part 11 of door edge 12.

Sheath 5 is provided with an axially extensible part 51, which is corrugated and of general conical shape, the larger-diameter end of this part being joined in sealed manner to the wall of inclined part 11 of the door edge by engagement of an annular collar 52 in a cutout 12 made for this purpose in the sheet metal, having the traditional form for a cable passage.

Sheath 5 is provided with a second part 53, which is integral with the first axially extensible part 51 and prolongs it on the smaller-diameter side.

A cutout is made in the lower part of the center pillar, this cutout receiving a second connecting element 31 of an electrical connecting system 3 of a type known in itself, such as a tab connector, first element 32 of which is connected to end 56 of second part 53 of the sheath and is coupled with second connecting element 31 by an elastically locked socket connection.

Figure 4:
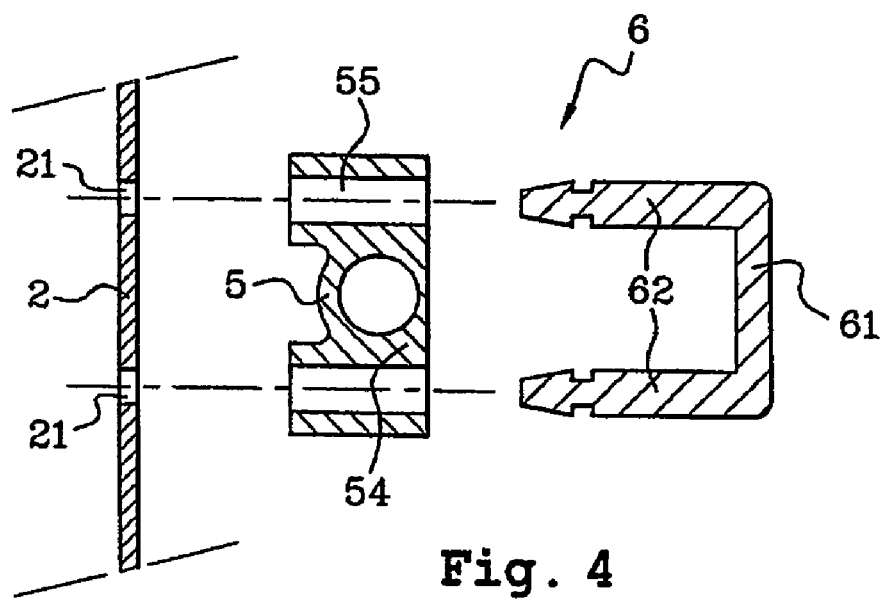
FIG. 4 is a view of the means of fixation of the sheath on the center pillar, before they are installed.

Second sheath part 53 is static as soon as the sheath is fixed on the center pillar by a fixation member 6 situated between the two parts 51 and 53 of the sheath and made integral with the sheet-metal wall of the center pillar. As shown in FIG. 4, the fixation member comprises a part in the form of flange 54 formed in one piece by molding together with the sheath. A U-shaped bracket 61 clamps flange 54 against the center pillar, the two branches 62 of the bracket passing into holes 55 of the said flange and being provided at their ends with elastic latching members that engage in corresponding holes 21 of center pillar 2.

Preferably, as illustrated in the figures, second part 53 of the sheath is also made of molded rubber and corrugated, in such a way that it can be substantially deformable in flexion. As is evident in FIG. 1, connecting system 3 is not situated at the same height as fixation member 6. The same offset exists on the other side of the vehicle, but in symmetric manner, which would mean that sheaths which have general shapes symmetric relative to the longitudinal vertical central plane of the vehicle, and therefore different shapes, would have to be used for the two sides of the vehicle. By virtue of the capacity of the said second part of the sheath to be deformed in flexion, it is in fact possible to use the same sheath for both sides of the vehicle, and, in addition, the same sheath can also be used in the case of slight variations of the relative position of connecting system 3 and fixation member 6, for example for different types of vehicles. Ultimately, therefore, this makes it possible to reduce the number of different sheaths to be manufactured.

Preparation and mounting of the cable passage are achieved as follows:

During preparation of the door, the cables of electrical bundle 7 are connected in a manner known in itself to connector element 32, pass into sheath 5 and emerge from it on the side of collar 52, from which they are connected inside the door to the electrical devices in question. Cable bundle 7 is fixed on a wall of door 1 by a plastic staple 71 or the like, in such a manner as to form a loop 72 that can be freely deformed, as will be seen hereinafter.

During mounting of the door on the vehicle, connector element 32 is connected to fixed element 31, and flange 54 is fixed to the center pillar by bracket 61.

Figure 2:
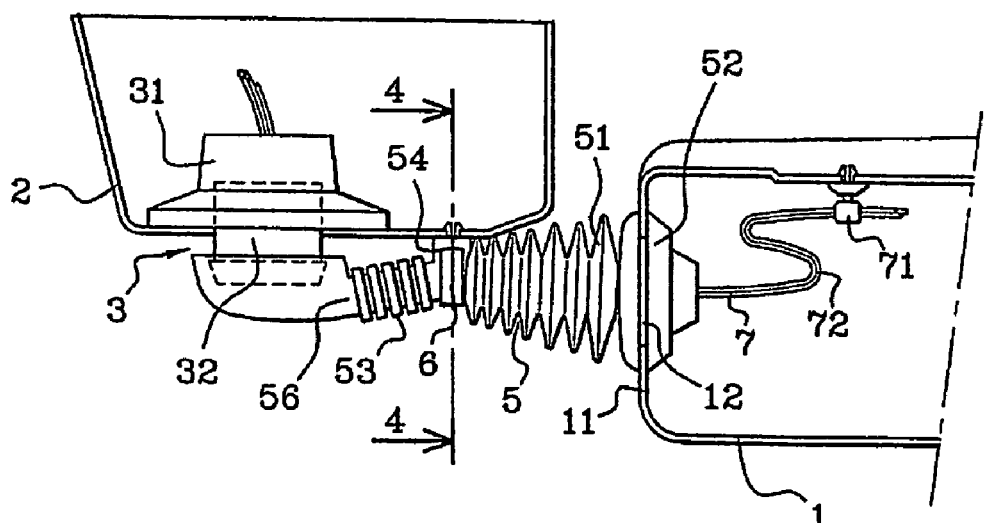
FIG. 2 is a detail view in section along line 2-2 of FIG. 1, when the door is closed.

When the door is closed, first part 51 of the sheath has a reduced length, and the cable bundle forms loop 72 in the door, as illustrated in FIG. 2.

Figure 3:
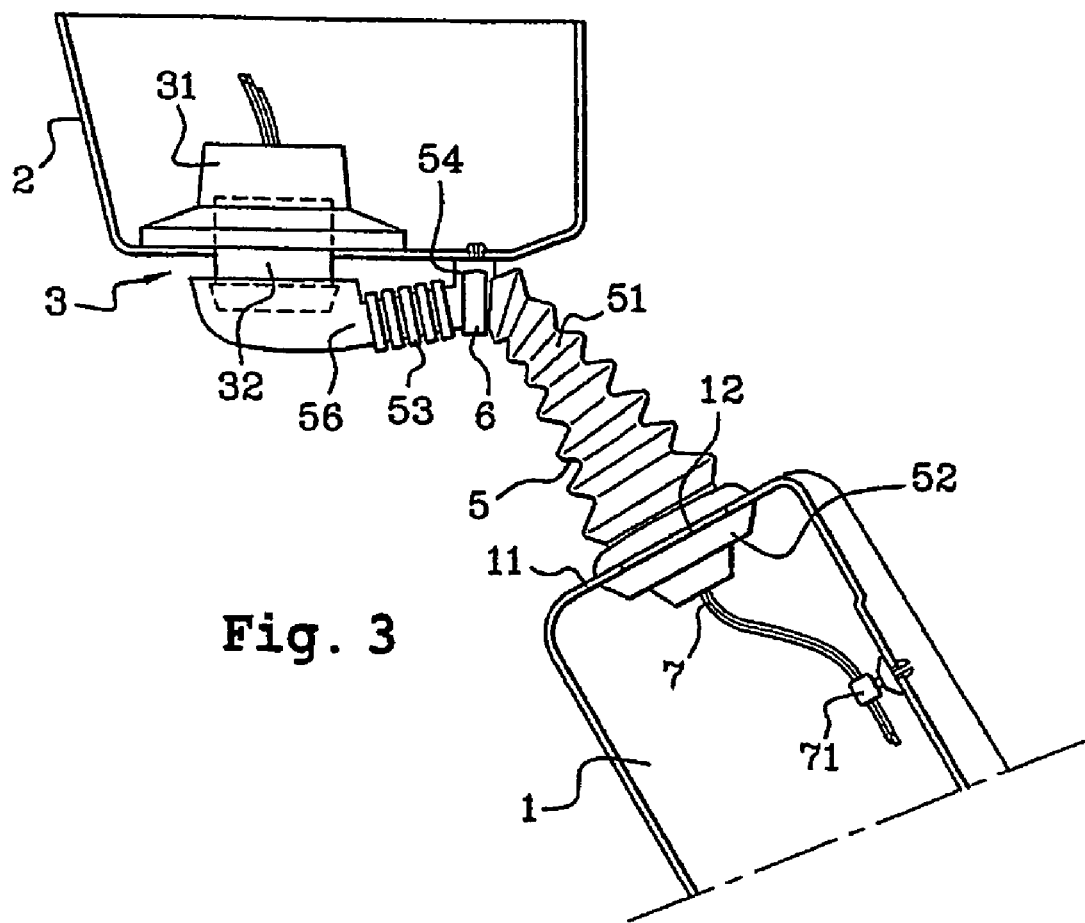
FIG. 3 is a corresponding view when the door is open.

When the door is open, as illustrated in FIG. 3, inclined part 11 of the door edge moves away from center pillar 2, causing lengthening of first part 51 of the sheath. Cable bundle 7 remains fixed in second part 53 of the sheath, but slides into second part 51 during lengthening thereof, while loop 72 is taken back, as is clearly evident in FIG. 3.

When the door is closed once again, part 51 collapses on itself in the manner of a bellows, assisted in this regard by its conical shape, and the part of the cable bundle that had previously slid inside the sheath emerges from it once again, pushed by the part kept fixedly in fixed part 53 of the sheath, the bundle having in itself sufficient rigidity to resist buckling in the sheath and being assisted in this regard by the guidance that the sheath itself offers up to the level of collar 52.

The invention is not limited to the embodiment that has just been described exclusively by way of example. In particular, it will be possible to construct the member for fixation of the sheath on the body and the electrical connector in any other adequate manner capable of defining a fixed point of the sheath on the body and of ensuring a sealed connection of the said sheath with the wall of the body on which they are fixed. Of course, the system according to the invention can also be used for the connection between the vehicle body and doors other than a rear door.

The invention claimed is:

1. A cable-passage system between a body and a door of a motor vehicle, comprising:
    a flexible sheath through which electric cables pass, the sheath including
        an axially extensible part, wherein a first end of the axially extensible part is fixed to the body and a second end of the axially extensible part is connected to an edge wall of the door on a border of a cable-passage orifice cut into the edge wall, such that the axially extensible part of the sheath becomes longer when the door is opened, and
        a deformable in flexion part connected to the axially extensible part, wherein a first end of the deformable in flexion part is joined to the body at a cable passage in a body wall, and a second end of the deformable in flexion part is fixed to the body; and
    a fixation member configured to fix the first end of the axially extensible part and the second end of the deformable in flexion part to the body,
    wherein the cables have sufficient free length inside the door such that the cables can slide into the sheath to absorb length variations of the sheath during pivoting of the door.

2. A cable-passage system according to claim 1, wherein the axially extensible part is corrugated and has a conical general shape, which flares out at the second end of the axially extensible part.

3. A cable-passage system according to claim 1, wherein the first end of the deformable in flexion part is connected to a first connecting element of an electrical connector configured to be coupled with a second connecting element of the electrical connector, which is fixed permanently on the body wall.

4. A cable-passage system according to claim 1, wherein the fixation member is configured to rigidly connect a flange integral with the sheath to the body wall.

5. A cable-passage system according to claim 4, wherein the flange is formed in one piece with the sheath.

6. A cable-passage system according to claim 4, wherein the fixation member is fixed on the body wall by an elastic sleeve-joint arrangement such that an end portion of the fixation member passes through a hole in the body wall to engage with the body wall.

7. A cable-passage system according to claim 4, wherein the fixation member comprises a bracket that clamps the sheath by passing two lugs of the bracket into respective holes of the flange before the bracket is clipped into the body wall.

8. A cable-passage system according to claim 4, wherein the second end of the axially extensible part includes a groove that is countersunk into the border of the cable-passage orifice cut into the edge wall of the door to keep the sheath fixed in a sealed manner on the edge wall.

9. A cable-passage system according to claim 4, wherein the cables emerging from the sheath into the door slide freely into the axially extensible part of the sheath and are fixed inside the door with a free length between a point of fixation in the door and the second end of the axially extensible part fixed on the door that is sufficient to permit elongation of the sheath without pulling on the cables during opening of the door.

10. A motor vehicle provided with at least one door equipped with electric devices, provided with a cable-passage system according to claim 1.

11. A cable-passage system according to claim 4, wherein
    the flange is formed in one piece with the sheath,
    the first end of the axially extensible part is directly connected to the flange, and
    the second end of the deformable in flexion part is directly connected to the flange such that the axially extensible part is connected to the deformable in flexion part by the flange.

12. A flexible sheath, comprising:
    an axially extensible part located at a first end of the sheath, wherein a first end of the axially extensible part is configured to be fixed to a body of a vehicle and a second end of the axially extensible part is configured to be connected to an edge wall of a door of the vehicle on a border of a cable-passage orifice cut into the edge wall, such that the axially extensible part of the sheath becomes longer when the door is opened;
    a deformable in flexion part located at a second end of the sheath, wherein a first end of the deformable in flexion part is configured to be joined to the body at a cable passage in a body wall, and a second end of the deformable in flexion part is configured to be fixed to the body; and
    a flange positioned between the axially extensible part and the deformable in flexion part, wherein the flange is configured to be fixed to the body of the vehicle,
    wherein the flexible sheath includes an opening therein such that cables can pass through the axially extensible part, the flange, and the deformable in flexion part.

13. A flexible sheath according to claim 12, wherein the flange is formed in one piece with the sheath.

14. A flexible sheath according to claim 12, wherein the flange is configured to receive two lugs of a bracket into respective holes of the flange to fix the flange to the body.

15. A method of passing cables between a body and a door of a motor vehicle, comprising:
    fixing a first end of an axially extensible part of a flexible sheath to the door;
    fixing a first end of a deformable in flexion part of the flexible sheath to the body;
    locating a flange positioned between a second end of the axially extensible part and a second end of the deformable in flexion part;
    fixing the flange to the body with a fixation member; and passing cables from an opening in the body through the deformable in flexion part, through the flange, through the axially extensible part, and into an opening in the door.

16. A method according to claim 15, further comprising: fixing the cables inside the door with a free length between a point of fixation in the door and the first end of the axially extensible part fixed on the door that is sufficient to permit elongation of the flexible sheath without pulling on the cables during opening of the door and the cables can slide into the flexible sheath to absorb length variations of the sheath during pivoting of the door.

* * * * *